United States Patent [19]
Pleitner et al.

[11] Patent Number: 5,104,217
[45] Date of Patent: * Apr. 14, 1992

[54] SYSTEM FOR DETERMINING AND CONTROLLING THE ATTITUDE OF A MOVING AIRBORNE OR SPACEBORNE PLATFORM OR THE LIKE

[75] Inventors: Peter K. Pleitner; Robert K. Vincent, both of Ann Arbor, Mich.

[73] Assignee: GeoSpectra Corporation, Ann Arbor, Mich.

[*] Notice: The portion of the term of this patent subsequent to Feb. 7, 2006 has been disclaimed.

[21] Appl. No.: 307,658

[22] Filed: Feb. 6, 1989

Related U.S. Application Data

[63] Continuation-in-part of Ser. No. 840,332, Mar. 17, 1986, Pat. No. 4,802,757.

[51] Int. Cl.⁵ .............................................. H01V 39/12
[52] U.S. Cl. ........................................ 356/2; 356/141; 364/456
[58] Field of Search ........................... 356/1, 4, 141, 2; 250/558; 364/434, 456

[56] References Cited

U.S. PATENT DOCUMENTS

| | | | |
|---|---|---|---|
| 3,997,795 | 12/1976 | Pohl et al. | 250/558 |
| 4,313,678 | 2/1982 | Colvocoresses | 356/2 |
| 4,504,914 | 3/1985 | Hofmann | 356/2 |
| 4,708,472 | 11/1987 | Hofmann | 250/558 |
| 4,802,757 | 2/1989 | Pleitner et al. | 356/2 |

Primary Examiner—Richard A. Rosenberger
Attorney, Agent, or Firm—Dykema Gossett

[57] ABSTRACT

A system for determining the attitude of an airborne or spaceborne platform such as a terrain image sensor or an energy beam pointer includes a digital image correlator for comparing successive overlapping, instantaneous images of the terrain which are recorded by a second, two-dimensional image sensor whose image plane is oriented parallel to that of the platform or terrain image sensor. The second sensor generates an instantaneous master image and a subsequent slave image which at least partially overlaps the master image in terms of the terrain which is viewed. The master and slave images are approximately registered and a correlation is performed. A plurality of points on the slave image are correlated with the corresponding terrain points on the master image. The relative orientation of the slave image with respect to the master image characterizes the attitude change of the platform. The technique also reveals changes in altitude and velocity of the platform when mean altitude and velocity are known. The image produced by the terrain image sensor or the attitude of the beam pointer can be altered on a real time basis using the information relating to the change in platform attitude, or the master and slave image data can be recorded for subsequent use in modifying the image data recorded by the terrain image sensor. A multispectral scanner is employed to detect in advance regions that cannot be properly imaged due to clouds and the like and a computer controlled mirror directs images onto the sensor from regions that the scanner has determined to produce meaningful image data.

47 Claims, 13 Drawing Sheets

SYSTEM FOR DETERMINING AND CONTROLLING THE ATTITUDE OF A MOVING AIRBORNE OR SPACEBORNE PLATFORM OR THE LIKE

RELATED APPLICATIONS

This is a continuation-in-part of U.S. application Ser. No. 840,332 filed Mar. 17, 1986, now U.S. Pat. No. 4,802,757.

TECHNICAL FIELD

The present invention broadly relates to systems for detecting changes in and controlling the attitude of an airborne or spaceborne platform such as an imaging sensor or beam pointer mounted on a spacecraft or aircraft and deals more particularly with a system for detecting and correcting the attitude changes using a terrain imaging technique.

BACKGROUND ART

Multispectral imaging scanners are commonly mounted on moving aircraft or satellites for the purpose of recording images of earth terrain as they pass over the earth's surface. The images are recorded as data which consist of a series of scan lines whose relative orientation with respect to other scan lines may change as the aircraft or spacecraft moves along its line of flight. The attitude of aircraft and spacecraft is subjected to perturbations induced by roll, pitch, yaw, altitude, and velocity changes which introduce non-systematic geometric distortions into the image of the terrain. In the case of aircraft, such perturbations result from wind buffeting, changes in air density and inadvertent course changes. Perturbations in a satellite environment are more subtle, but can also result from atmospheric buffeting (in low altitude orbit), orbital control maneuvers, and changes in the satellite's center of mass (i.e. fuel consumption, antenna and solar array orientation changes).

In order to correct the geometry of the "raw" image data, it is usually possible to identify pixels with ground control points on maps for every few scan lines in the image data by searching maps for the exact location of features which are distinct pixels (picture elements) in the image data, then mathematically warping and resampling the entire image to arrive at the best fit for all the ground control points. However, this approach is especially expensive in terms of the time and labor required to manually correlate the recorded image data with the position of ground control points, and the correction relies exclusively upon the accuracy and density of the ground control. Another solution to this problem involves horizon seekers, star pointers and inertial navigation systems on-board the spacecraft or aircraft. These attitude sensors detect and record attitude change data required for the partial geometric correction of image data. Such data is not optimal for at least three reasons: first, they use features or inertial references which are not an intrinsic part of the recorded terrain data; second, they can cost as much as the primary sensor; and third, their weight and power consumption maybe prohibitive for some applications.

Consequently, there is a need in the art for a lightweight, more efficient, and less expensive system for detecting and recording the attitude changes of a platform, such as an imaging sensor platform, which can be used either for aircraft or satellite terrain image sensor applications.

The problems of accurately determining changes in the attitude of an airborne or spaceborne platform discussed above are also applicable to other uses of such platforms, such as mounting an energy beam pointing device which may comprise, for example a mirror arrangement to reflect energy beams, or an antenna employed to receive or transmit energy in the radio frequency spectrum. In many applications, minute changes in the attitude of the beam pointing platform can have a major impact on the aiming accuracy of the beam pointer where extremely precise pointing accuracy is required. Attitude control systems for correcting and altering the attitude of beam pointer mechanisms of course require dynamic, real time control, thus dictating a system capable of quickly detecting minute changes in platform attitude and dynamically controlling servomotors quickly after the attitude change has been sensed in order to re-aim the energy beam.

The above problems of determining changes in platform attitude are exacerbated by atmospheric or geological characteristics that interfere and sometimes prevent a complete "snap shot" image from being formed of the entire area of the earth beneath the aircraft or spacecraft. For example, the area of the ground within the field of view beneath the spacecraft or aircraft may not be completely visible due to cloud cover or the presence of a body of water, which make it impossible to measure changes in platform and attitude and altitude, even through there may be some area on the ground within the field of view of the imaging sensor which exists either between the clouds or on either side of the body of water for which imaging data can be generated. However, in the past, under these circumstances, the data so acquired by the primary imaging sensor corresponding to images within the sensor's field of view that are between clouds or on the other side of a body of water is discarded because the overall data set for the entire field of view does not possess sufficient quality for mapping purposes. Accordingly, it would be desirable to employ a method of determining and altering the attitude of the platform which is not dependent upon requiring an entire set of "good" mapping data from the primary sensor's full field of view, but rather is effective through the use of only a partial data set, the data corresponding to images of that portion of the ground within the field of view that can indeed by "seen" by the sensor which is not otherwise obscured.

SUMMARY OF THE INVENTION

According to one aspect of the present invention, a system for determining the attitude changes of an air or spaceborne terrain imaging sensor platform or energy beam pointing platform includes a second sensor, preferably comprising a two-dimension panchromatic image sensor, and a digital image correlator used to compare successive, overlapping and instantaneously acquired two-dimensional image terrain data. The second sensor generates a series of master and slave images, with each slave becoming a master when a succeeding slave image is produced. Digital image correlation is performed in order to identify a plurality (preferably five) of pixels on the master image with the same geographic points on the slave image. The correlation is performed by selecting a plurality (preferably five) of spatially distributed patches of pixel arrays in the slave image, and then moving these arrays about the master image in order to find the gray scale correlation coefficient for each patch. The locations with the highest correlation coefficients are selected as the true locations of the slave patches relative to the master image. The row and column of the correlated pixels in the slave image are recorded and the relative orientation of the slave image with respect to the master image is found using the coplanarity condition of photogrammetry. The relative orientation of the master and slave images uniquely characterizes the new attitude of the sensor platform, i.e. the change in platform attitude between the points in time at which the master and slave images were recorded. The data acquired with the two-dimensional imaging sensor may be stored for later use, or it may be processed in real time to obtain information which characterizes the changes in the sensor platform and correct geometry of the terrain image data recorded by the primary sensor. The information regarding changes in platform attitude and altitude may be employed to reposition the energy beam pointer.

According to another aspect of the invention, a method is provided for adjusting the pointing of a device for reflecting or originating a beam of energy, wherein the device is carried on a platform of an airborne or spaceborne craft which travels along a flight path above the surface of the earth and experiences changes in attitude or altitude which affect the direction that the device is pointed. The method includes the steps of generating a first set of data representing picture elements of a first two-dimensional image of the surface area at a first point along the flight path such that the data representing all of the picture elements of the first image are generated substantially simultaneously, generating a second set of data representing picture elements of a second two-dimensional image of the surface at a second point along the flight path closely spaced from the first point such that at least a portion of the images overlap each other, correlating a plurality of corresponding picture elements of the first and second images in the overlapping portion thereof such that the relative positions of the correlated picture elements represent the changes in attitude or altitude, generating a set of data representing the changes in attitude or altitude of the platform based on the correlation results, and then altering the attitude of the platform or beam-pointing mechanism so that the device points the beam of energy in the desired pre-selected direction using the data thus generated.

In accordance with a further aspect of the invention, a method is provided for determining changes in the attitude or elevation of a platform carried on an airborne or spaceborne craft which is similar to that described above, but further includes the step of analyzing the regions ahead of the craft to identify unobscured surface areas which include features from which data may be generated related to the attitude and altitude of the platform. This analysis is preferably performed using a multispectral scanner which scans a path ahead and traverse to the flight path of the craft. Upon identifying unobscured surface areas ahead of the craft, such surface areas are imaged on to a sensor, notwithstanding the fact that the areas immediately beneath the craft may be obscured or contain featureless or dynamic surface areas such as bodies of water or bodies of clouds.

Finally, still further aspect of the invention resides in an apparatus for determining changes in the attitude or altitude of a platform carried by an air or spaceborne craft which implement the methods described above.

Accordingly, it is a primary object of the present invention to provide a system for detecting changes in the orientation of a moving air of spaceborne platform, such as a terrain imaging multispectral scanner (sensor) or an energy beam pointer, which is particularly simple, accurate, cost effective and reliable.

A further object of the invention is to provide a system of the type mentioned above which is capable of dynamically controlling the platform substantially simultaneously with the detection of changes in the platform's attitude.

Another object of the invention is to provide a system, as described above, in which changes in platform attitude may be determined using mathematical techniques executable by a computer.

A further object of the invention is to provide a system, as described above, which may be employed to correct for perturbations in a remotely-sensed image-containing terrain data either on a near real time basis or off-line basis.

Another object of the invention is to provide a system, as described above, which is also capable of providing information relating to changes in the altitude and velocity of any airborne or orbiting platform.

A still further object of the invention is to provide a system, as described above, which is compatible for use with conventional, airborne and spaceborne sensors and is particularly lightweight and compact.

Another object of the invention is to provide a system of the type mentioned above which is capable of determining changes in the attitude of the platform in spite of the fact that a full image data set cannot be obtained within the field of view of the sensor due to partial cloud cover or the like.

These objects, in addition to other objects and uses for the invention, will manifest themselves in the ensuing description.

BRIEF DESCRIPTION OF THE DRAWINGS

In the drawings, which form an integral part of the specification and are to be read in conjunction therewith, and in which like reference numerals are employed to designate identical components in the various views.

DESCRIPTION OF THE PREFERRED EMBODIMENTS

Figure 1:
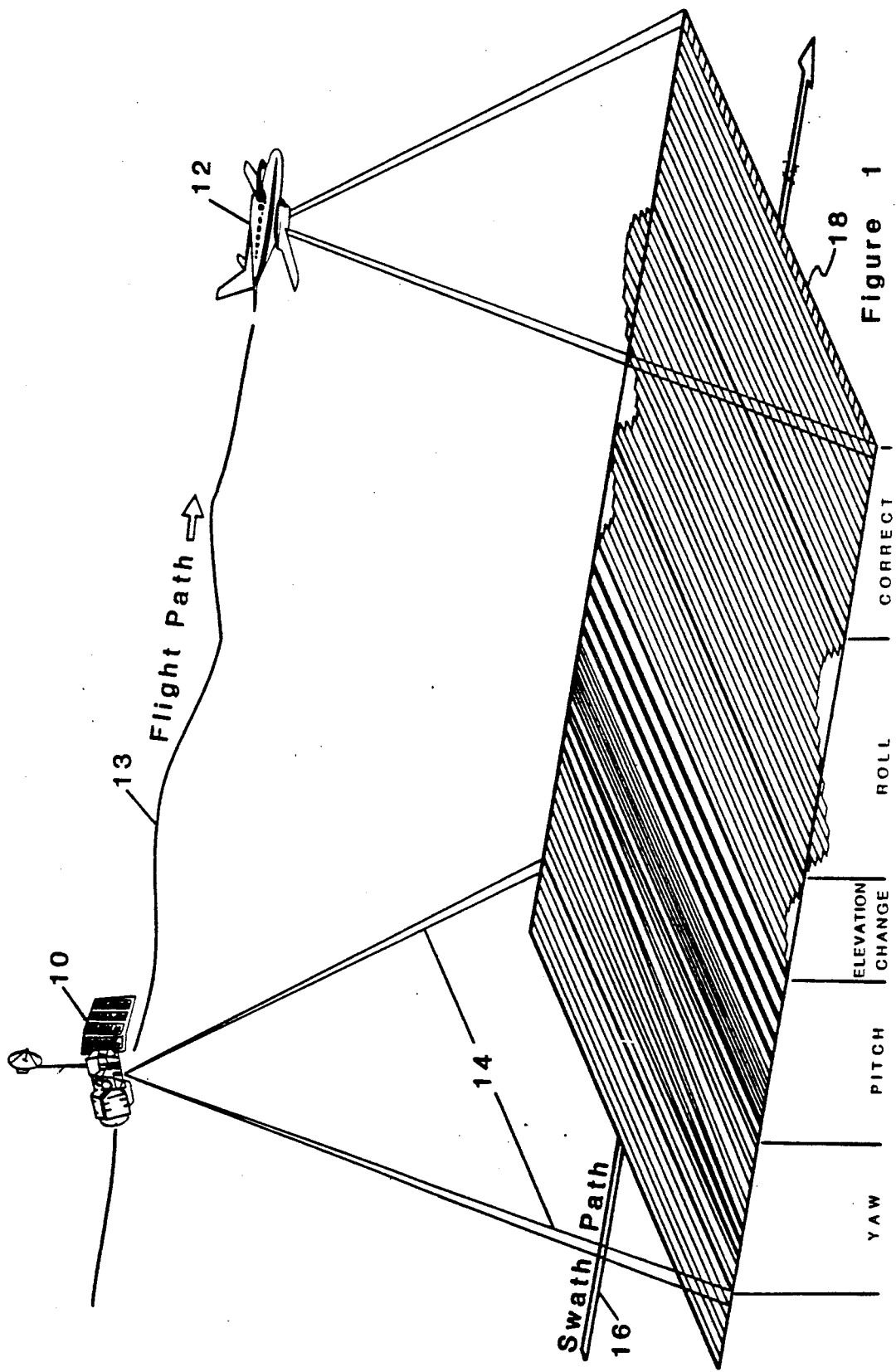
FIG. 1 is a diagrammatic, perspective view of the swath path of a terrain imaging sensor or energy beam pointer being carried by a moving platform, typically a sensitive or aircraft, and showing minor platform stability perturbations which introduce significant geometric distortions in the terrain data.

Referring first to FIG. 1, one aspect of the present invention broadly relates to a system for detecting and measuring the attitude changes of a platform aboard a moving vehicle such as a satellite 10 or an aircraft 12 flying or orbiting along a selected flight path 13. Any of various devices may be mounted on such platform which require precise aiming, including a sensor, a scanner or an energy beam pointer such as a laser beam reflecting mirror or a radio frequency antenna. It is to be understood here, however, that the term "platform" is used in its broadest sense to describe any structure, gimbals, or mechanisms to which the sensor, pointer, scanner, etc. is connected or upon which the same is mounted, even through such structure, gimbal or mechanism is movable with respect to the aircraft or spacecraft. For purposes of the immediately following description and for sake of simplicity it will be assumed that a sensor is mounted on the platform. Changes in platform location and attitude result in sensor orientation changes with respect to the terrain it is imaging and introduce non-systematic geometric distortions in the image terrain data. By way of example, the platform mounted sensor may consist of a panchromatic or a multispectral scanner which is employed to view terrain below the platform and generate electronic signals. These signals can be processed by a computer to create images of the terrain below the flight path 13 as the platform passes over the earth's surface. The imaging sensor has a field of view 14 which traverses the earth's surface along a swath path 16. For purposes of the present description, the imaging sensor will be referred to as the primary sensor, which may be either an optical-mechanical type or the more modern type which employs one-dimensional linear arrays, commonly referred to as a "push broom" or "multi-linear array" scanner. A panchromatic (black and white) representation of the latter type is used for illustrative purposes. In either case, the image sensor includes photosensitive detector elements arranged in a common focal plane, along with optical elements, and various types of electronic components. The orientation or attitude of the focal plane, the aim of the optics, and the sensor's altitude above the terrain determine the field of view on the earth's surface.

Figure 2:
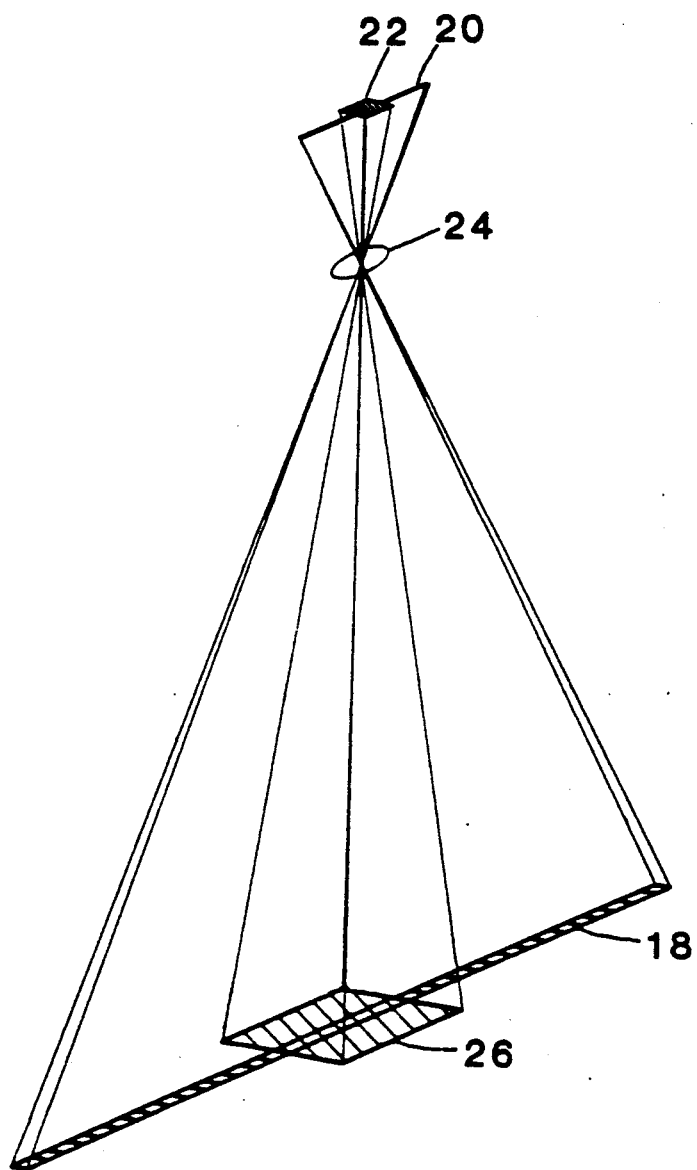
FIG. 2 is a diagrammatic, perspective view showing the geometric relationship between the image terrain sensor and the attitude sensor with respect to the scanned terrain.

As shown in FIG. 2, a simplified terrain sensor may comprise a one-dimensional or linear array 20 onto which a linear strip 18 of terrain is focused by means of a lens 24. Repetitive scanning of successive strips on the earth's terrain by the linear array sensor 20, and the forward motion of the sensor's platform, result in the acquisition of a set of image data scan lines which can be processed in a computer to form an essentially composited picture of the surface traversed by the sensor's field of view.

Ideally, the sensor platform mounted on the satellite 10 or aircraft 12 will attempt to maintain a steady or linear flight path 13 at a constant velocity, attitude and altitude when the earth's surface is being scanned by the terrain image sensor 20 so that successive image scan lines are all recorded in perfect geometric relationship with respect to previously recorded scan lines. In fact, however, non-systematic changes in aircraft's 12 attitude, altitude, and velocity occur due to the effects of wind buffeting, changes in air density, and inadvertent course changes or, in the case of a satellite 10, the effects of atmospheric buffeting, orbital control maneuvers, and changes in the satellite's center of mass due to fuel consumption, antenna and solar array orientation changes, etc. These "platform changes" result in corresponding changes in the attitude of the terrain image sensor 20, which in turn introduce geometric infidelity into the image data. Geometric infidelity in the image data is extremely difficult to remove by subsequent image processing without an intimate knowledge of the frequency and magnitude of the perturbations imposed on the sensor 20. The present invention is directed toward providing a system for detecting attitude, altitude, and velocity changes in the platform. It involves recognition of the fact that changes in platform attitude can be detected and measured by comparing two, two-dimensional overlapping images of terrain acquired by a second imaging sensor instantaneously from two points along the platform's flight path.

As shown in FIG. 2, in accordance with the present invention, a second terrain image detector or sensor 22 is mounted on the same platform as the primary image sensor 20, and may consist of a commercially available two-dimensional array of photosensitive elements mounted in a common focal plane. The second sensor 22 is mounted such that its image plane is parallel to, or preferably coplanar with, that of the first linear array sensor 20. Suitable electronics (not shown) of a conventional nature are employed to electronically scan the second sensor array 22 to obtain a synoptic digital image raster (i.e. all image data in one frame is obtained from the same point of view, or instant in time, from the flight path) of all or part of the terrain scanned by the primary sensor 20. This latter-mentioned image data is used as the reference from which changes in attitude, altitude and velocity are detected and measured. As conceptually illustrated in FIG. 2, the scan area 26 scanned by the second sensor 22 through the lens 24 overlaps the scanned area of the linear array 20. Although this may be convenient from a system engineering point of view, this configuration is not a requirement as long as sensor 22 records overlapping two-dimensional images of a reference terrain.

Figure 3:
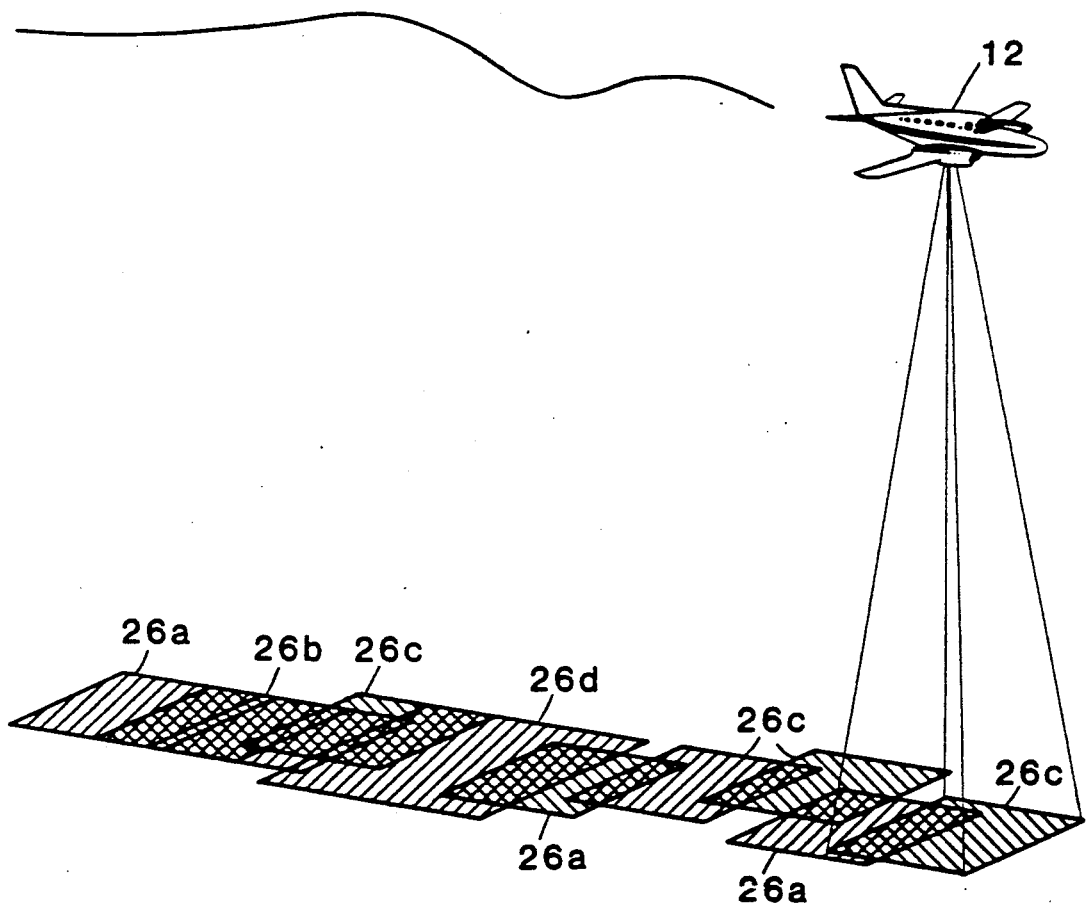
FIG. 3 is a diagrammatic, perspective view of the successive, overlapping master and slave images recorded by the attitude sensor.

Referring now to FIG. 3, sensor 22 is employed to record a series of overlapping images corresponding to the scan areas 26 on the ground. Each of the images or scan areas 26 is a "master" image and the succeeding image constitutes a "slave" image of the master. The time interval between recording successive images of the scan areas 26 will be determined by the velocity of the sensor platform, the total field of view of the sensor, the nominal frequency of sensor platform attitude, velocity and altitude changes, the spatial resolution of an element of the two-dimensional array 22, and the spatial resolution of an element of the linear array 20. The scan area 26 will vary in position and size in accordance with changes in the attitude, velocity and altitude of the sensor platform 12, illustrated as an aircraft. For example, the scan area 26a corresponds to a set of conditions where the sensor platform 12 is assumed to be on its proper flight path, at a constant altitude and velocity. Scan area 26c represents the area of the earth which is imaged when the sensor platform 12 undergoes a roll. Scan area 26d represents the image which is acquired when the sensor platform 12 rises above the altitude it had when it acquired its previous image. The corresponding changes of the image recorded by the terrain image sensor 20 are depicted in FIG. 1. In any event, it may be appreciated that the changes in the image recorded by the linear array 20 are directly related to the changes in the images recorded by the sensor 22 since both of these sensors 20, 22 have focal planes which are fixed relative to each other and are therefore perturbed in the identical manner by external forces.

An overview of the system will now be provided, followed by a more detailed description with reference to the drawings. A spatial displacement factor between the master and subsequent slave images is predicted from the velocity and altitude of the sensor platform 12, and is then applied as an offset to the image rasters, i.e. the sets of digital data which respectively represent the master and slave images. The master and slave images are then registered, and a minimum of three, and preferably five, pixels from the master image are tested for correlation with corresponding pixels in three or five patches of the slave image. Perfect correlation results when there are no changes in the sensor platform's velocity, attitude (when compared to nominal values assumed) or changes in attitude (yaw, roll or pitch) in that segment of the sensor platform's trajectory. In the event of less than perfect correlation, a series of geometric offsets are applied to patches of the slave image and the correlation of the master image is repeated. The collection of offsets, applied to slave image patches, which best correlate to the master image characterizes the geometry of a change from the predicted location (i.e. velocity and altitude) and attitude of the sensors 20, 22. In other words, the three or more pixels in the slave image which attained the highest correlation coefficient between the master and slave images define the orientation of the two-dimensional array of the sensor 22, and thus define the change in the location and attitude of the sensor 20, between the times that the master and slave images were recorded. It is therefore possible to define the relative temporal change of the sensor platform's location and attitude with respect to the master image data previously collected by the attitude data acquisition imaging sensor over a reference area on the terrain.

The absolute attitude of the sensors 20, 22 can best be determined if the reference area is well known on the ground. However, this absolute attitude determination is somewhat more practical for a satellite sensor platform which passes over the same earth terrain in a mater of hours or days, than for an aircraft sensor platform. In the event that the reference area on the terrain is not well known, the sensor platform's change in attitude and change from its expected location is detected by the sensor system 22 relative to the sensor platform's attitude and location over the previously recorded reference area. This is sufficient to correct the resulting images recorded by the terrain image sensor 20 for altitude, velocity and attitude variations which have occurred during the time it takes for the primary imaging sensor 20 to acquire at least two image scan lines.

Figure 4:
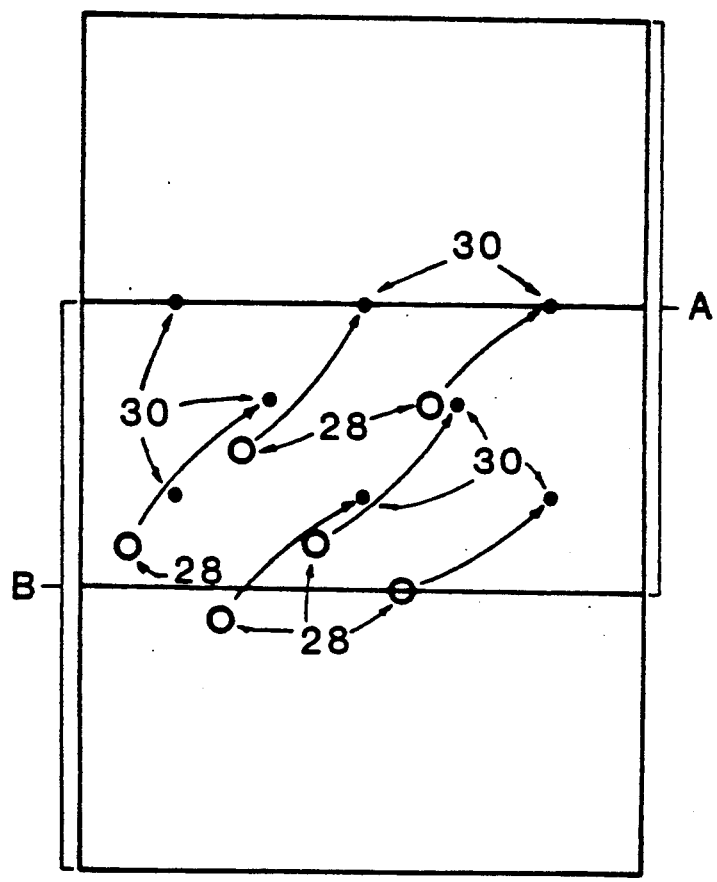
FIG. 4 is a diagrammatic view of sequential master and slave images, wherein identical geographic points of the images are respectively designated by circles and dots.

Reference is now made to FIG. 4 which depicts overlapping master and slave images, respectively, designated by the letters "A" and "B". A plurality of terrain reference points on the slave image are designated by the circles 28. These same reference points are represented on the master image by the dots 30, with the arrows correlating the circles 28 with the corresponding dots 30. As shown in FIG. 4, the master and slave images, "A", "B", respectively, are depicted in the "as acquired" geometry of the overlapped part of the slave image. The amount of overlap was mathematically predetermined based on the elapsed time interval between the recording of these master and slave images and the predicted velocity and altitude of the sensor platform 12.

It is then necessary to determine the geometric orientation of the slave image relative to the master image such that the corresponding points on the terrain 28, 30 are in registration with each other, that is to say, when the terrain points 28, 30 are "correlated" and geometrically coincident. The geometric attitude of the slave image which results in coincident terrain points 28, 30 can be derived from a plurality of terrain points on the slave image. These points represent a high correlation with the same points recorded on the master image. This is accomplished by selecting at least three or preferably five spatially dispersed reference points on the slave image. Although from simple rules of geometry it is known that only three points are required to define a plane, it cannot be assumed that the terrain which contains those points to be correlated is a simple plane, or that the elevation of every point on that terrain is known. Therefore, it is normally necessary to rely upon relative orientation principles of photogrammetry that require a minimum of five points, which are identifiable in both the slave and master image (correlated), in order to define all of the variables which will solve the mathematical orientation problem in a relative sense, i.e. the slave image relative to the master image. The coplanarity condition of photogrammetry requires that for each of the five points chosen, the ray connecting the point on the ground with the camera's lens at a first point in time, and the corresponding point on the film image and the ray connecting the same ground point with the camera's lens at a second point in time with the corresponding point on the second film image, both lie in a single plane. The relative orientation operation requires that at least five pairs of rays (as found using the coplanarity condition) intersect in order that all pairs of rays in the two arrays intersect. The coplanarity condition and the equations defining same are discussed in more detail in the *Manual of Photogrammetry*, American Society of Photogrammetry, 4th Edition, page 55 et seq., Copyright 1944, 1952, 1966, 1980, the contents of which are incorporated by reference herein.

Figure 5:
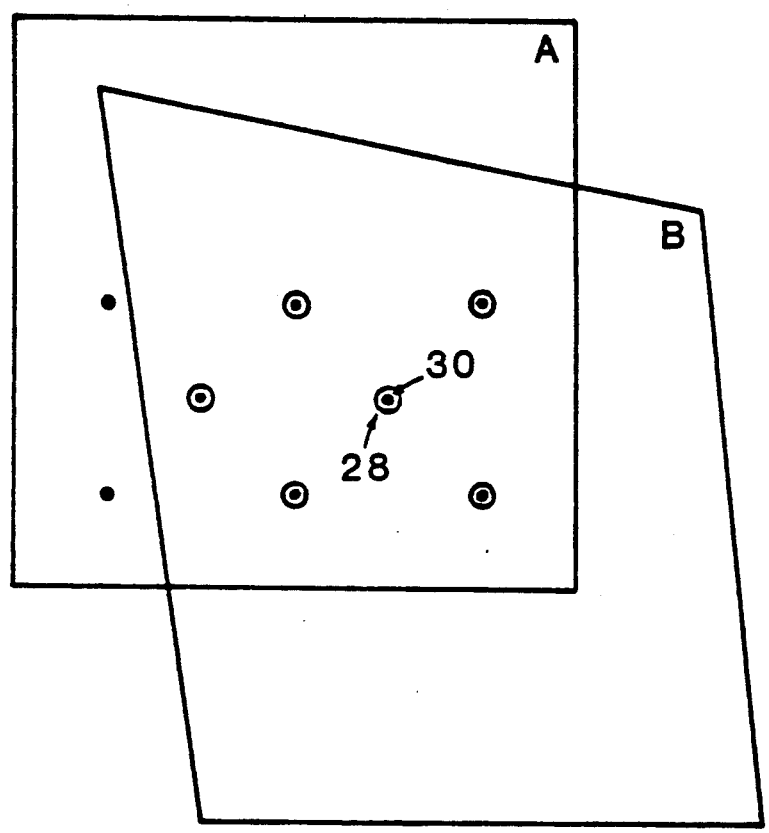
FIG. 5 is a diagrammatic view of the master and slave images after the correlation has been performed, with the identical geographic points between the two images being designated by coincident circles and dots.
Figure 6:
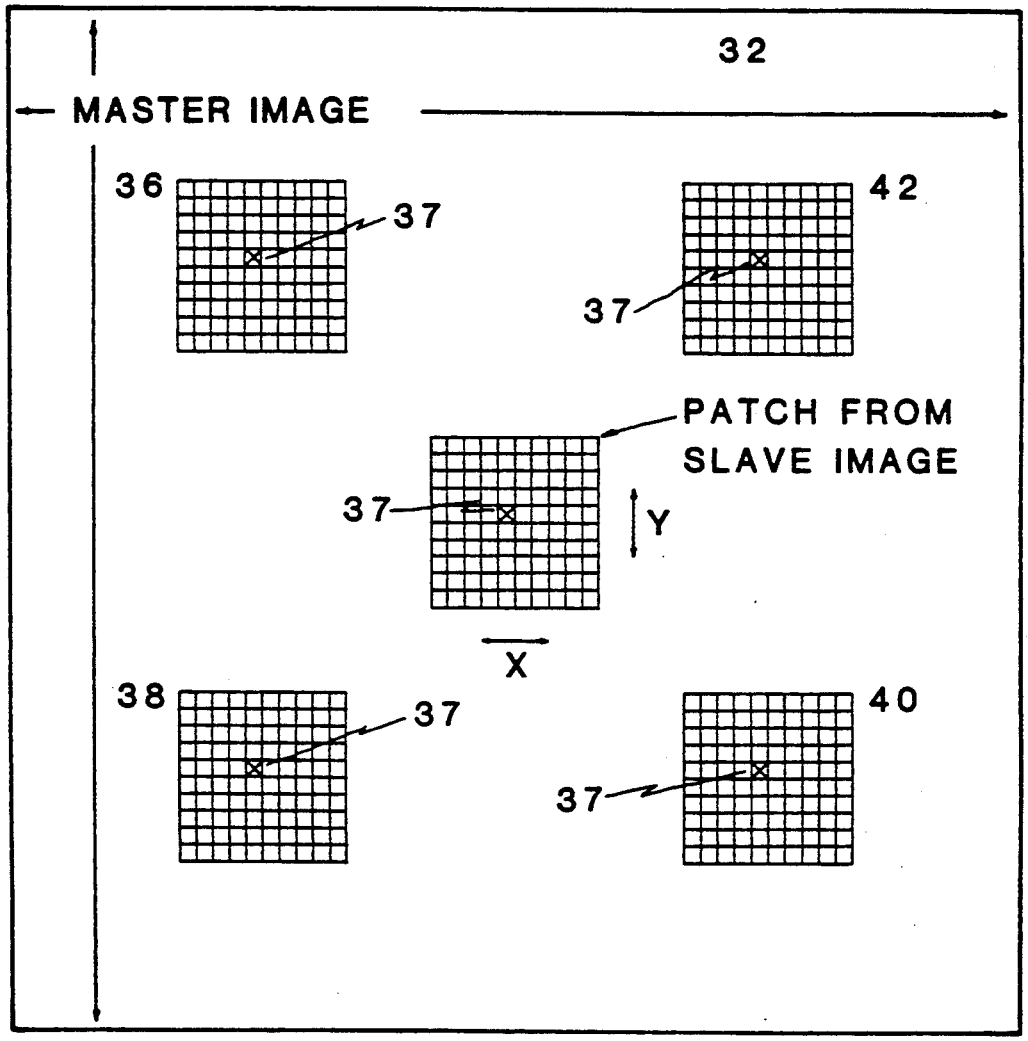
FIG. 6 is a diagrammatic view which depicts the outline of the master image, and the pixel patches or arrays extracted from the slave image which are mathematically superimposed and shifted relative to each other.

Referring now also to FIG. 6, five patches 34-42 from the slave image are then selected for correlation with the reference points 37 on the master image. Each of the patches 34-42 are illustrated as a 9×9 array of pixels. A correlation is then performed to determine the amount of gray scale (brightness) correlation between every pixel in patches of the slave image 34-42 with the corresponding reference point or pixel 37 in the master image. Gray scale intensity or brightness is a value which is a function of average integrated radiance on the ground point represented by a pixel. In effect, the slave image patches 34-42 are incremented in the X and Y direction (as shown in FIG. 6) so that a correlation is performed between each X, Y location in the slave image patches 34-42 and the corresponding reference point or pixel 137. This image data processing technique is sometimes referred to in the art as "neighborhood processing". The pixel in the slave image patches 34-42 having the highest correlation coefficient is then selected and its X, Y location in the pixel array or patch is recorded. The recorded locations of the pixels having the highest correlation in the slave patches 34-42 define the true locations of the slave patches 34-42, and thus of the entire slave image relative to the master image. FIG. 5 illustrates slave image "B", spatially registered relative to the master image "A" after the slave image has been geometrically "warped" in two dimensions relative to the master image such that reference points 28, 30 are coincident.

The system described above can be implemented using one relatively large, or five or more relatively small, two-dimensional solid state array(s) of photosensitive elements mounted in the same focal plane as the primary image data acquisition sensor, or a focal plane which is coplanar to it. The arrays can either be connected with a special purpose, high speed image processor which performs the image correlation process in "real time", or the image data acquired by the attitude data acquisition imaging sensor can be recorded with a synchronization signal generated by the primary sensor for "off-line" processing and geometric correction of image data acquired by the primary imaging sensor on an as needed basis. These processors are conventional in the art, consequently, their details need not be described herein. However, such a processor may consist of commercially available software such as ATOM (Automatic Topography Mapper) which was developed by and is available from GeoSpectra Corporation of Ann Arbor, Mich. The output of the processor may consist of either the location of the five or more slave image pixels correlated to the master image, or of the equation of the plane of both the master and slave images. As the sensor platform 12 continues along its flight path, the old slave image becomes the new master image, but the planes of all the slave images are traceable back to the original master image.

Figure 7:
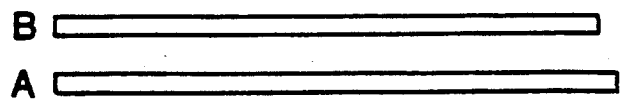
FIG. 7 is an elevational view of the master and slave images in which the only change in the sensor platform is one of altitude.
Figure 8:
FIG. 8 is an elevational view of the master and slave images in which the only changes in the sensor platform is one of velocity.
Figure 9:
FIG. 9 is an elevational view of the master and slave images in which the only change in the sensor platform is one of pitch.

As shown in FIG. 7, changes in the altitude of the aircraft 12, and thus the sensor platform, are detected merely as changes in the image scale, or the distance between correlated sets of pixels on the master and slave images, with the planes of the master and slave images remaining parallel but no longer coplanar. As shown in FIG. 8, a change only in the velocity of the platform 12 (and thus of the imaging sensor) results in a different linear translation of the image planes, with both the master and slave images remaining coplanar. The master and slave images no longer remain coplanar or parallel in the event of the yaw, pitch or roll of the sensor platform. The non-coplanar condition of the master and slave image planes caused by a simple change in platform and sensor pitch is illustrated in FIG. 9.

Figure 10:
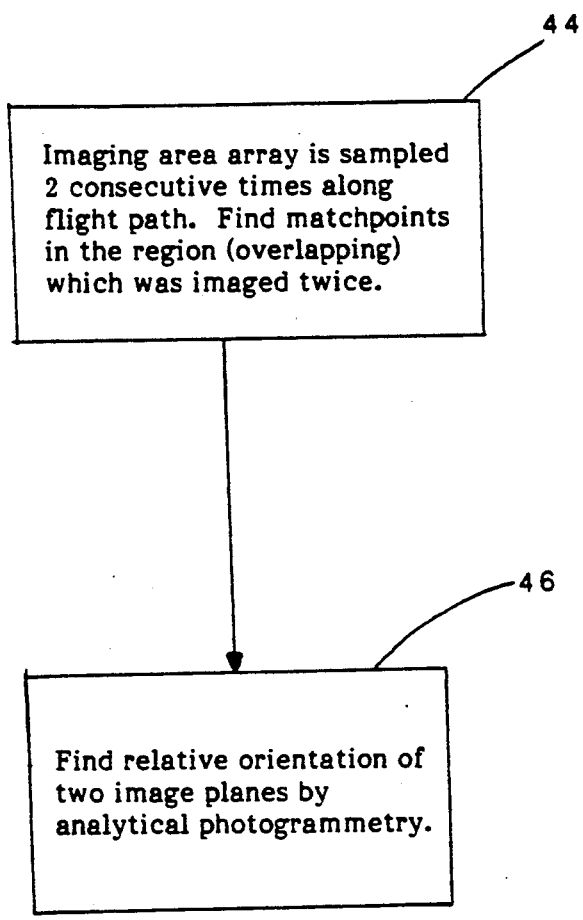
FIGS. 10-13 are flow charts for a computer program for implementing the system.
Figure 11:
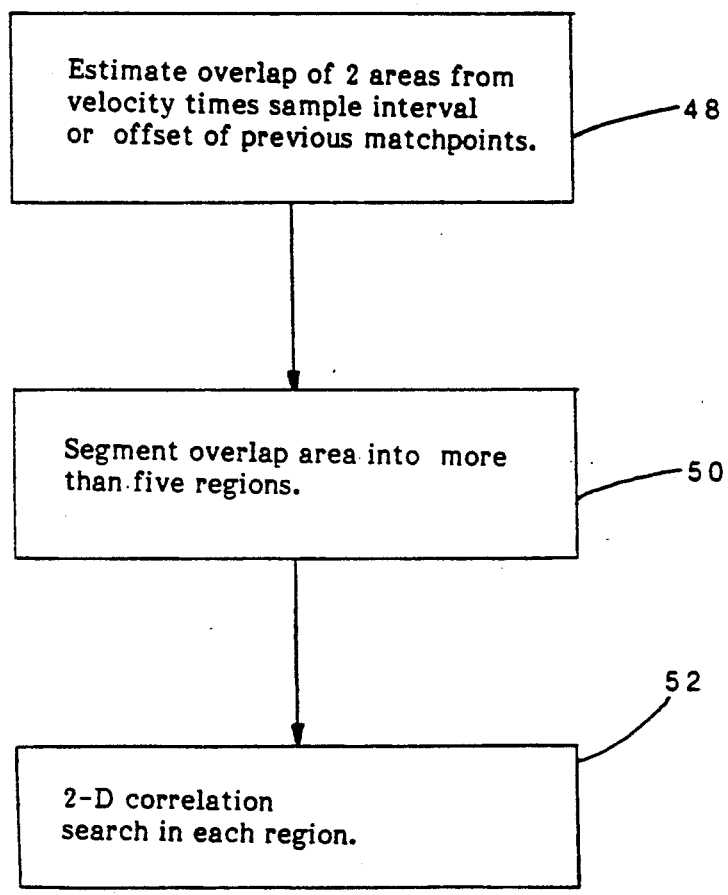
Figure 12:
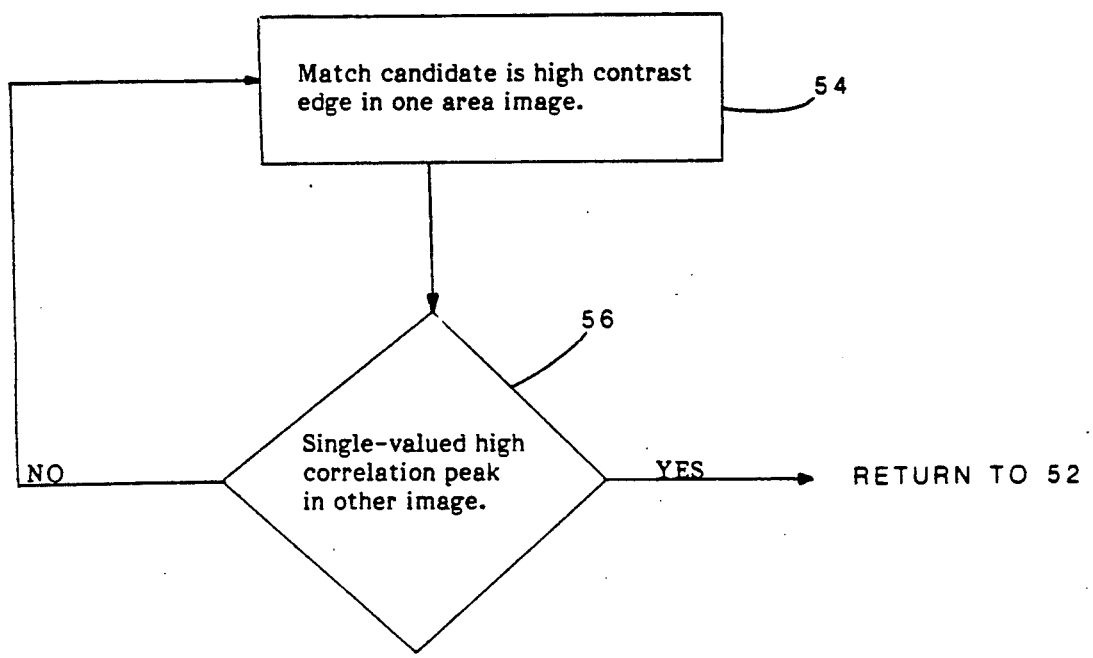

A logic flow chart for a typical computer program which implements the system described above is depicted in FIGS. 10-13. Referring to FIG. 10, the first step 44 in the program consists of successive locations along the flight path in order to acquire the master and slave image data. Then, image correlation is performed in patches of the overlapping master and slave image region in order to identify correlated match points in that area of the terrain which is imaged twice. The second step 46 consists of determining the relative orientation of the slave image plane with respect to the master image plane using the principles of relative orientation from photogrammetry mentioned above, which require a minimum of five correlated match points located in both the master and slave images. The sub-routine for performing step 44 is shown in FIGS. 11 and 12. The first step of the sub-routine at 48 consists of applying the same offset derived from the previous master/slave image correlation procedure, or an estimate based upon the nominal platform velocity multiplied by the image sensor sampling interval. The overlapping area is then segmented into at least five or more patches at 50 if a relatively large, two-dimensional imaging array is employed as the attitude sensor, or the five or more terrain image patches are acquired by five or more relatively small two-dimensional area arrays as described above. A two-dimensional correlation search is then performed in each master and slave image data patch at 52. The correlation step 52 is performed by having a computer select the match candidate area in the master image which has the highest contrast edge and/or point in one two-dimensional image at 54 of FIG. 12. An analogous equivalent procedure for visual inspection would be the selection of a distinct set of pixels. At step 56, if the matched candidate in the master image does not have a suitably high correlation peak in the slave image, additional candidates are processed, otherwise control is transferred to step 52.

Figure 13:
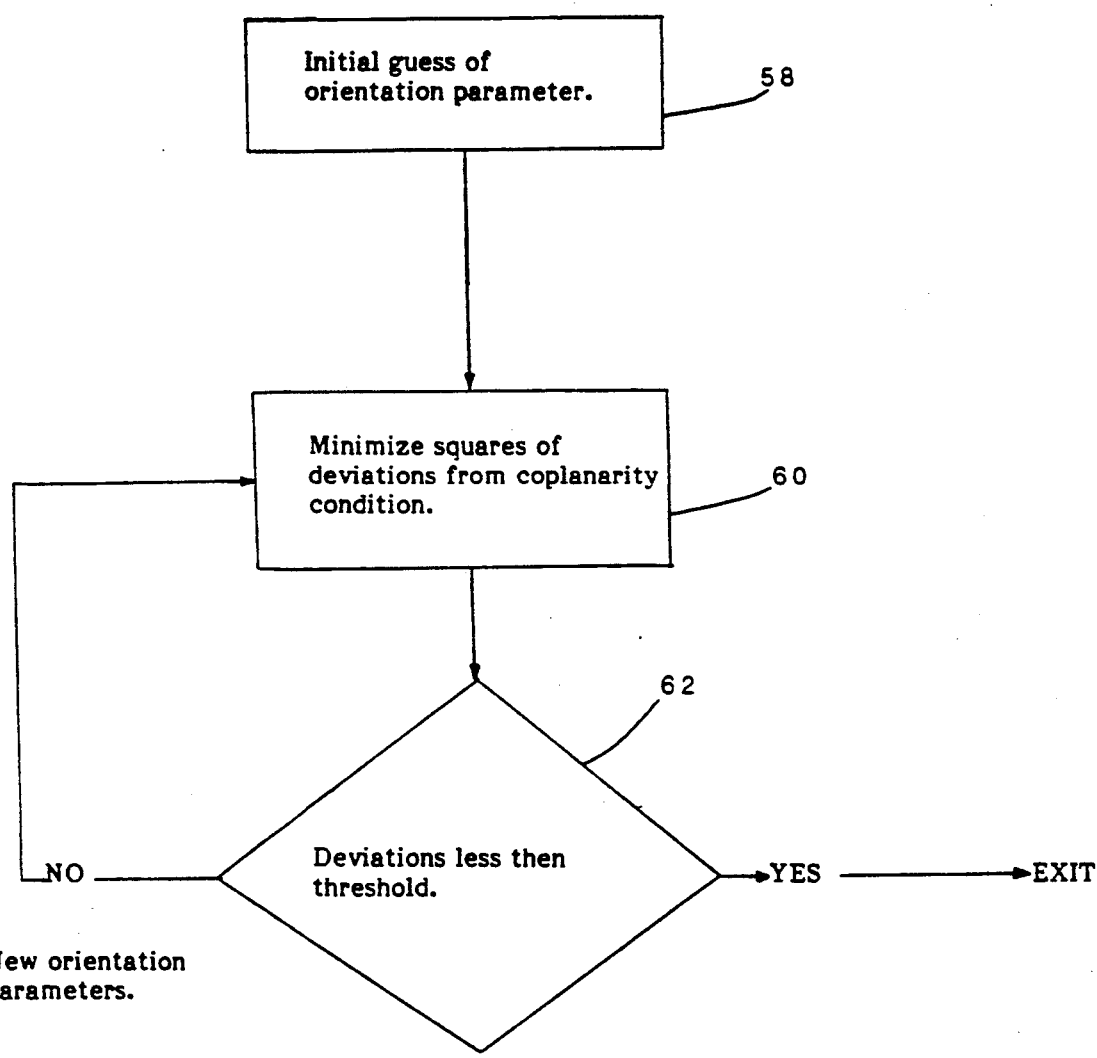

The sub-routine for performing step 46 (FIG. 10) is shown in FIG. 13. An estimate of the orientation parameters is initially made at step 58, followed by a mathematical step performed at 60 consisting of minimizing the squares of deviation from the ideal condition of master and slave image coplanarity for five or more paris of correlated points. A determination is made at 62 as to whether the deviations are less than a threshold value (determined by the geometric precision required of the image data acquired by the primary imaging sensor). If the deviations are less than the threshold, step 60 is repeated. Otherwise, the sub-routine is terminated. The output product of this process is the collection of equations which describe successive focal planes, hence the locations and attitudes of the primary imaging sensor and its platform. These equations will enable precise geometric corrections of image data acquired by the primary sensor, either in a relative sense with respect to image data previously recorded on that "flight" segment, or in an absolute sense with respect to a map of the terrain. The latter case requires an image data base of uniquely identifiable areas on the terrain, including their map coordinates and elevations, which can be used to orient a master or slave image with respect to the terrain, using the above-described correlation and coplanarity test methodologies.

Again, while one aspect of the invention has been described above in connection with a scanning type sensor undergoing perturbations, it is to be emphasized that the present invention is equally applicable where certain other kinds of devices are mounted on the platform, such as an energy beam pointing device, e.g. a reflector or antenna. The reflector or antenna may function to direct an energy beam to a target either on the ground or to another aircraft or spacecraft. The functional requirements for a platform attitude or altitude data acquisition system used to geometrically control image data acquired by the primary terrain imaging sensor on the platform, and one used to precisely control the pointing of a beam of energy from the same platform are identical, with the exception that the latter application necessitates the output data being employed to dynamically control the beam pointing mechanism rather to correct image data. Thus, the acquired set of attitude and altitude data is used to adjust the reflector or antenna; this may be accomplished by sending signals to the mechanism, typically servomotors, used to change the orientation of the reflector or antenna or alternatively for example (in the case of a satellite) to fire thruster jets which correct the satellite's attitude so that the reflector or antenna is properly positioned. The details of controlling the reflector or antenna in this manner using the acquired information regarding attitude and altitude are well known in the art and therefore need not be discussed here.

Figure 14:
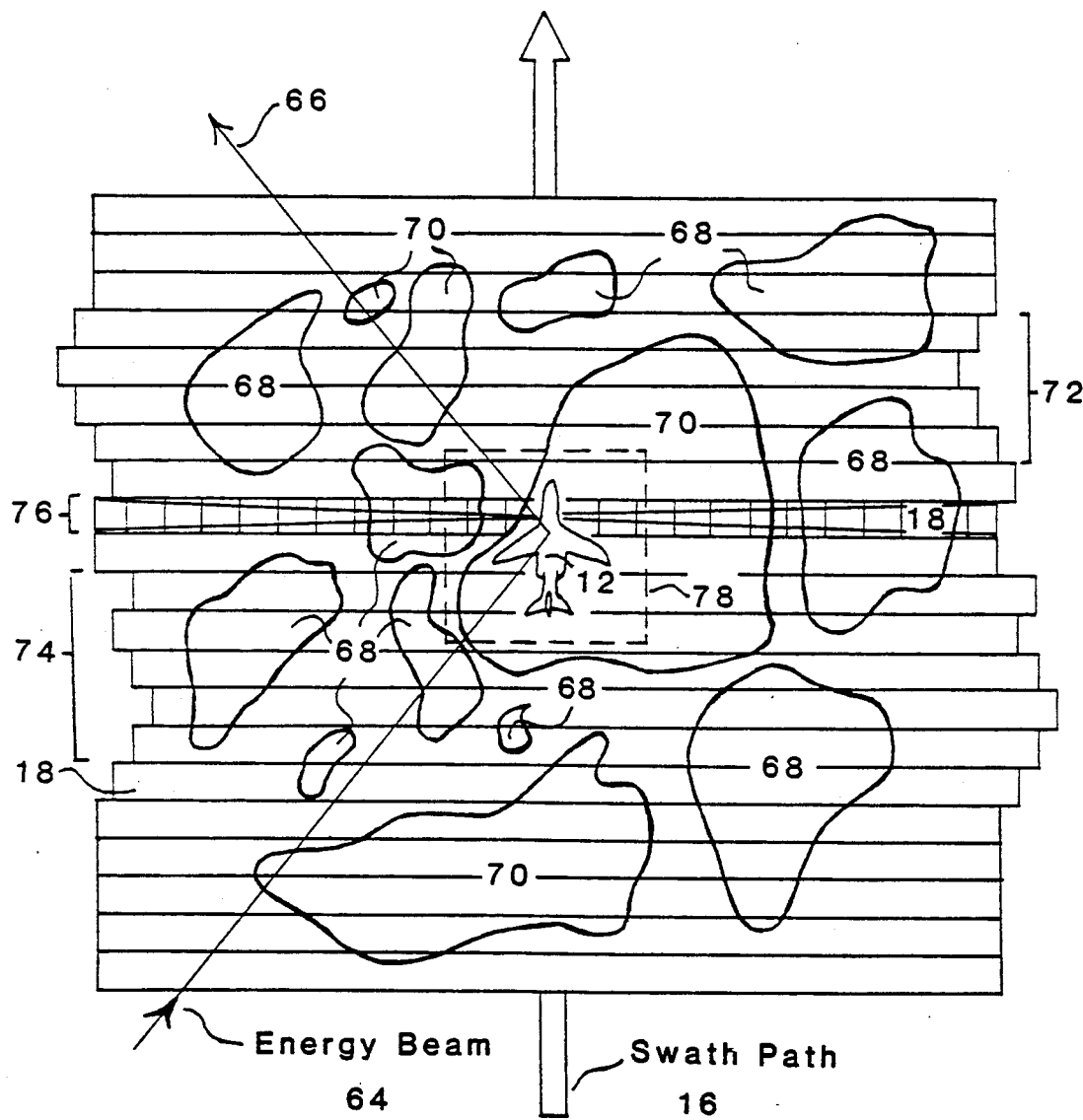
FIG. 14 is a diagrammatic plan view of the swath path of an imaging sensor carried on the platform of an aircraft, in which uncorrelatable bodies of water and clouds are within the normal field of view of the imaging sensor.

Another aspect of the method of the present invention will now be discussed with reference to FIG. 14 which is similar in many respects to FIG. 1, and shows an aircraft 12 moving along a desired flight path, although it is to be understood that the following description is equally applicable to a satellite or other spacecraft. The aircraft 12 is equipped with a platform of the type mentioned above on which there is mounted a terrain imaging sensor which may comprise a two-dimensional array, of the type designated by the numeral 22 in FIG. 2, as well as the reflector or energy beam pointer. As shown in FIG. 14, an energy beam 64 is directed to the reflector or antenna mounted on a platform carried by the airplane 12 which then precisely points the beam in the direction indicated by the numeral 66. As mentioned above, the energy beam 64 may originate either from a ground station or another aircraft or spacecraft and, likewise, the reflected beam 66 may be directed to another aircraft or spacecraft, or alternatively to the ground. Also, the outgoing beam of energy 66 may be generated at the aircraft 12, in the case of a radio transmission, for example.

In any event, the two-dimensional sensor array records successive, overlapping sets of image data as the aircraft 12 moves along its path of flight and the novel method described above is performed in order to determine changes in the altitude and attitude of the aircraft 12, and thus of the platform and reflector or beam pointer. For purposes of illustration, in FIG. 14, successive scans 18 are indicated along the swath path 16 including several formed during a roll of the aircraft 12, indicated at 74 and during changes in altitude shown at 72.

The data regarding changes in attitude and altitude mentioned above is generated on a real time basis and is employed by an on board control system, typically including a preprogrammed computer, to dynamically control the attitudes of the reflector or antenna. Typically, such control will be effected by sending control signals to servomotors or the like which control the mechanism which moves the mounting platform in order to precisely redirect the outgoing energy beam. The calculation of changes in attitude and altitude, and the subsequent repointing of the reflector or antenna are carried out substantially at the same time so that repointing is performed as quickly as possible after a change in attitude or altitude has been detected.

It often occurs that the ground below the image sensor or beam pointing platform, within the field of view of the two-dimensional imaging array, is not visible due to cloud cover indicated by the number 68 or the presence of a body of water indicated at 70. For example, at the position of the aircraft 12 indicated in FIG. 14, the imaging array is scanning across a path indicated at 76 in which the terrain is partially obscured by a lake 70 and clouds 68. Note that the width of the field of scan 76 by the primary sensor is considerably wider than that of the two-dimensional sensor array, designated by the numeral 78. Such presence of clouds or bodies of ground water which obscure the field of view of the secondary, two-dimensional array sensor ordinarily preclude measurement of changes in the platform attitude and altitude. As a result, the data acquired by the much wider field of the primary imaging sensor must be discarded due to poor quality for many applications including mapping because such data cannot be corrected for attitude and altitude, even through the primary sensor records mapping data that is otherwise valuable for mapping purposes. In the case of applications for energy beam reflection or pointing, the limitation described above is even more critical since the conditions (clouds, water) directly below the aircraft (and thus the two-dimensional imaging array) are likely to be inconsequential to its mission. In other words, the nature of the ground immediately below the aircraft normally has no affect or relationship to the direction and destination of the beam of energy to be reflected or directed by the aircraft 12.

Even when the two-dimensional sensor array is recording image data where clouds or water partially cover or obscure its field of view, its output data regarding attitude and altitude changes cannot be relied upon with a high-level of confidence for two reasons. First, the image detail and/or contrast may be insufficient to achieve successful point correlations between successive images. Secondly, the ground surface being imaged is not stable; in other words, the ground surface may not have discernible features and/or is moving such that its appearance changes between two successive "looks" by the two-dimensional array sensor. In order to overcome this limitation, it has been discovered that the location of the obscuring clouds or ground water can be determined in advance and a means is provided for pointing the sensor 22 to a location which is not so obscured, so that meaningful attitude and altitude change data can be generated even though obscuring clouds or ground water are located beneath the aircraft 12, where the sensor 22 would otherwise record image data that would not yield changes in the attitude and altitude.

Figure 15:
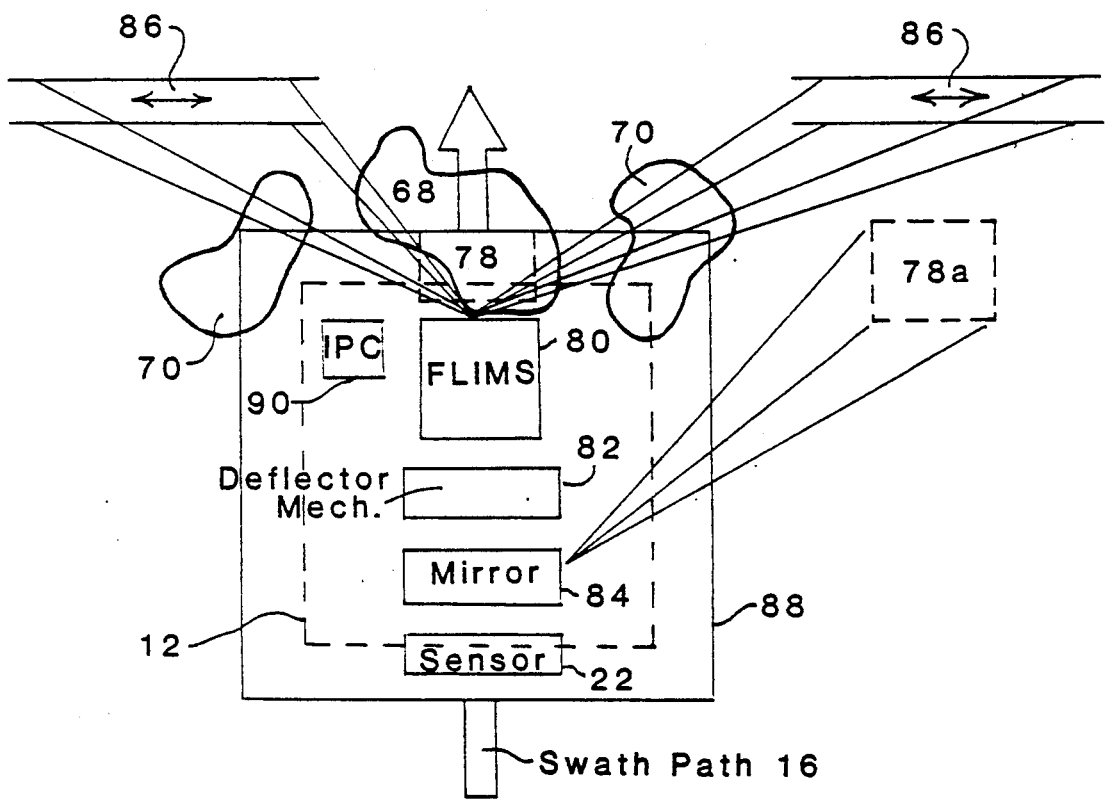
FIG. 15 is a diagrammatic plan view of a swath path showing a method and device for determining changes in the attitude and altitude which forms an alternate embodiment of the present invention.

Referring now also to FIG. 15, the aircraft 12 includes a reflective mirror 84 which is mounted on a mechanism of a conventional type (not shown) well known in the art which allows it to be pointed in a desired direction. The mirror 84 is also positioned such that it may reflect to the sensor 22 a two-dimensional image on the ground at a location determined by the pointing of the mirror 84. The mirror is pointed in the desired direction by means of a conventional deflector mechanism which can include, by way of example, conventional servomechanisms (not shown). The deflector mechanism 82 and thus the mirror 84 are controlled by a forward-looking image multispectral sensor (FLIMS), which is a conventional device well known in the art which records images in multiple spectral bands, and is thus capable of distinguishing regions on the earth from clouds, open water or other featureless regions for which the image data would otherwise be uncorrelatable. The FLIMS 80 scans a large field of view traverse to the path of the aircraft 12, and ahead of the region on the earth to be imaged by the sensor 22. The multispectral image data collected by FLIMS 80 as a result of scanning forward traverse regions 86 on the earth is delivered to an on board image processing computer (IPC) for analysis. The IPC 90 includes one or more conventional, automatic feature recognition algorithms which determine the nature of the surface imaged by FLIMS 80 and thus knows in advance whether there exist any areas on the earth where the sensor 22 may be pointed in order to record meaningful ground images. The sensor 22 thus delivers image data to the IPC 90 and the IPC 90 determines whether the image being viewed by sensor 22 includes cloud cover, ground water or other featureless images, and in such an event controls the deflector mechanism 82 so as to train the sensor 22 on an alternate region of the earth 78a which is transverse to the normal field 88 scanned by the primary sensor (FIG. 2). Thus, the sensor 22 is directed to view the ground areas most favorable to generating useful, correlatable two-dimensional images and thus assures that useful attitude and altitude data may be collected.

Having thus described the invention, it is recognized that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A method of determining changes in the yaw, pitch, roll or elevation of an airborne or spaceborne platform which moves along a flight path above the earth comprising the steps of:
   (A) generating a first set of data representing picture elements of a first two-dimensional image of said surface at a first point along said flight path such that the data representing all of the picture elements of said first image are generated substantially simultaneously;
   (B) generating a second set of data representing picture elements of a second two-dimensional image of said surface at a second point along said flight path closely spaced from said first point such that at least a portion of said images overlap each other, and wherein the data representing all of the picture elements of said second image are generated substantially simultaneously,
   said picture elements varying in intensity in accordance with their respective locations on the corresponding images, the corresponding picture elements of the first and second images in the overlapping portions thereof being offset from each other by an amount related to changes in the yaw, pitch, roll or elevation of said sensor;
   (C) correlating a plurality of corresponding picture elements of the first and second images in the overlapping portion thereof, the relative positions of the correlated picture elements representing the changes in the yaw, pitch roll or elevation of said sensor; and,
   (D) calculating the condition of coplanarity using the relative positions of the correlated picture elements.

2. The method of claim 1, wherein step (C) includes the step of predicting expected locations of said selected reference picture elements in the N×M arrays.

3. The method of claim 2, wherein the step of predicting the locations of said selected picture elements is performed by determining the locations of selected picture elements in previously generated images of said surface.

4. The method of claim 1, including the steps of mounting a second sensor in fixed relationship to said airborne sensor and for movement along said flight path, such that the image planes of said sensors are parallel.

5. The method of claim 1, wherein steps (A) and (B) are performed by focusing images of said surface on a two-dimensional array of photosensitive elements.

6. The method of claim 1, including the step of registering said first and second images.

7. The method of claim 1, including the step of applying a geometric offset to said second set of data.

8. A method of determining changes in the yaw, pitch, roll or elevation of an airborne or orbiting platform which moves along a flight path above the earth comprising the steps of:
   (A) generating a first set of data representing picture elements of a first two-dimensional image of said surface at a first point along said flight path such that the data representing all of the picture elements of said first image are generated simultaneously;
   (B) generating a second set of data representing picture elements of a second two-dimensional image of said surface at a second point along said flight path closely spaced from said first point such that at least a portion of said images overlap each other, and wherein the data representing all of the picture elements of said second image are generated simultaneously,
   said picture elements varying in intensity in accordance with their respective locations on the corresponding images, the corresponding picture elements of the first and second images in the overlapping portions thereof being offset from each other by an amount related to changes in the yaw, pitch, roll or elevation of said platform;
   (C) correlating at least five corresponding spaced apart picture elements of the first and second images in the overlapping portions thereof, the relative positions of the correlated picture elements representing the changes in the yaw, pitch, roll or elevation of said platform; and,
   (C) calculating the condition of coplanarity using the relative positions of the correlated picture elements.

9. The method of claim 8, wherein step (C) includes the step of predicting the expected locations of said selected reference picture elements in the associated N×M array.

10. The method of claim 8, wherein steps (A) and (B) are performed by focusing images of said surface on a two-dimensional array of photosensitive elements.

11. The method of claim 8, including the step of registering said first and second images.

12. The method of claim 8, including the step of applying a geometric offset to said second set of data.

13. A method of adjusting the pointing of a device for reflecting or originating a beam of energy, wherein the device is carried on a platform on an airborne or spaceborne craft which travels along a flight path above the surface of the earth and experiences changes in attitude or altitude affecting the direction the device is pointed, comprising the steps of:

(A) generating a first set of data representing picture elements of a first two-dimensional image of said surface at a first point along said flight path such that the data representing all of the picture elements of said first image are generated substantially simultaneously;

(B) generating a second set of data representing picture elements of a second two-dimensional image of said surface at a second point along said flight path closely spaced from said first point such that at least a portion of said images overlap each other, and wherein the data representing all of the picture elements of said second image are generated simultaneously, said picture elements varying in intensity in accordance with their respective locations on the corresponding images, the corresponding picture elements of the first and second images in the overlapping portions thereof being offset from each other by an amount related to changes in the attitude or altitude of said platform;

(C) correlating a plurality of corresponding picture elements of the first and second images in the overlapping portion thereof, the relative positions of the correlated picture elements representing the changes in the attitude or altitude;

(D) generating a set of data representing the changes in attitude or altitude of said platform based on correlation performed in step (C), said data generating step including calculating the condition of coplanarity using the relative positions of the correlated picture elements; and, (E) altering the attitude of said platform such that said device points the beam of energy in a desired preselected direction, using the data generated in step (D).

14. The method of claim 13, wherein step (C) includes the steps of:

selecting at least three spaced apart, N×M arrays of picture elements in one of said images, selecting at least three spaced part reference pixel elements in the other of said images which are respectively associated with said three N×M arrays, and, comparing the at least three reference picture elements with each of the picture elements in the associated N×M arrays.

15. The method of claim 14, wherein (C) includes the steps of:

recording the row and column location of the picture element in each of said N×M arrays which has the highest correlation with the associated reference picture element, and, determining the plane which extends through the picture elements in said N×M arrays which have the highest correlation with the associated referenced picture elements.

16. The method of claim 15, including the step of determining the attitude of the determined plane of said first image.

17. The method of claim 13, wherein step (C) includes the step of predicting expected locations of said selected reference picture elements in the N×M arrays.

18. The method of claim 17, wherein the step of predicting the locations of said selected picture elements is performed by determining the locations of selected picture elements in previously generated images of said surface.

19. The method of claim 13, wherein steps (A) and (B) are performed by focusing images of said surface on a two-dimensional array of photosensitive elements.

20. The method of claim 13, including the step of registering said first and second images.

21. The method of claim 13, including the step of applying a geometric offset to said second set of data.

22. The method of claim 13, wherein at least steps (A) and (B) are performed on-board the craft.

23. The method of claim 13, wherein steps (D) and (E) are performed substantially immediately after completing steps (A), (B) and (C).

24. A method of determining changes in the attitude or elevation of a platform carried by an airborne or spaceborne craft which moves along a flight path above the surface of the earth and passes over at least patches of substantially featureless regions such as clouds and bodies of water, comprising the steps of:

(A) using a first sensor to identify unobscured surface areas in regions ahead of the craft which include features from which data may be generated related to the attitude and altitude of said platform;

(B) using a second sensor to record from the craft first and second overlapping two-dimensional images of a region identified in step (A) respectively at first and second points along said flight path steps (A) and (B) being performed substantially simultaneously;

(C) generating first and second sets of data representing picture elements respectively in said first and second images, said picture elements varying in intensity in accordance with their respective locations on the corresponding images, the corresponding picture elements of the first and second images in the overlapping portions thereof being offset from each other by an amount related to changes in the attitude of said craft; and, (D) correlating a plurality of corresponding picture elements of said first and second images in the overlapping portion thereof, the relative positions of the correlated picture elements representing the changes in attitude and altitude of said platform.

25. The method of claim 24, wherein steps (A) is performed by determining the spectral responses of areas within each of the regions identified in step (A).

26. The method of claim 25, wherein said spectral responses are determined by scanning said regions with an imaging multispectral sensor.

27. The method of claim 26, wherein said scanning is performed by scanning said regions in a direction transverse to the direction of said flight path.

28. The method of claim 26, wherein said scanning is performed on regions lateral to and generally outside of the regions beneath said craft and lying substantially along said flight path.

29. The method of claim 25, wherein step (A) is further performed by using a computer preprogrammed with a feature recognition algorithm to process said spectral responses.

30. The method of claim 24, wherein step (B) is performed by imaging said identified region onto a two-dimensional sensor array.

31. The method of claim 30, wherein said imaging is performed by orienting a reflector such that the image of said identified region impinges said reflector and is reflected onto said two-dimensional sensor.

32. The method of claim 31, wherein said imaging is further performed by generating a set of signals related to the location of said identified region and moving said reflector to reorient said reflector in accordance with said signal set.

33. The method of claim 24, wherein step (D) includes the steps of:
selecting at least three spaced apart, N×M arrays of picture elements in one of said images,
selecting at least three spaced apart reference pixel elements in the other of said images which are respectively associated with said three N×M arrays, and,
comparing the at least three reference picture elements with each of the picture element in the associated N×M arrays.

34. The method of claim 33, wherein (C) includes the steps of:
recording the row and column location of the picture elements in said N×M arrays which have the highest correlation with the associated reference picture elements.

35. The method of claim 34, including the step of determining the attitude of the determined plane relative to the plane of said first image.

36. The method of claim 24, wherein step (C) includes the step of predicting expected locations of said selected reference picture elements in the N×M arrays.

37. The method of claim 36, wherein the step predicting the locations of said selected picture elements is performed by determining the locations of selected picture elements in previously generated images of said surface.

38. The method of claim 24, including the step of mounting a two-dimensional image on said craft and in a manner such that said sensor experiences the same attitude and altitude changes as said platform, and wherein said first and second images are recorded by said sensor.

39. The method of claim 24, wherein steps (A) and (B) are performed by focusing images of said surface on said two-dimensional image sensor.

40. The method of claim 24, including the step of registering said first and second images.

41. The method of claim 24, including the step of applying a geometric offset to said second set of data.

42. Apparatus for determining changes in the attitude or altitude of a platform carried by an air or spaceborne craft which moves along a flight path above the surface of the earth and passes over at least patches of substantially featureless regions such as clouds and bodies of water, comprising:
first sensor means carried by said craft for identifying unobscured surface areas in regions ahead of said craft which include features from which data may be generated related to the altitude and attitude of said platform;
second sensor means operating substantially simultaneously with said first sensor means and carried by said craft for recording first and second overlapping, two-dimensional images of a region identified by said analyzing means, said first and second images being respectively recorded at first and second points along said flight path;
means for correlating a plurality of points in the overlapping portion of said first and second images, the relative positions of the correlated picture elements representing the changes in attitude and altitude of said platform; and,
means responsive to said analyzing means for controlling said recording means to record said images of said surface areas.

43. The apparatus of claim 42, wherein said analyzing means includes a multispectral scanner.

44. The apparatus of claim 42, wherein:
said recording means includes a photoresponsive sensor; and,
said controlling means includes means for imaging said surface areas onto said sensor.

45. The apparatus of claim 44, wherein said sensor is a two-dimensional array of photoresponsive elements.

46. The apparatus of claim 44, wherein said imaging means includes a reflector and means for moving said mirror to reflect an image of said surface areas onto said sensor.

47. The apparatus of claim 42, wherein said analyzing means includes a computer including an automatic feature recognition algorithm for recognizing features on said surface areas.

* * * * *

UNITED STATES PATENT AND TRADEMARK OFFICE
CERTIFICATE OF CORRECTION

PATENT NO. : 5,104,217
DATED      : April 14, 1992
INVENTOR(S): Peter K. Pleitner; Robert K. Vincent It is certified that error appears in the above-identified patent and that said Letters Patent is hereby corrected as shown below:

Column 14, line 63, change "(C)" to --(D)--.

Signed and Sealed this

Twenty-second Day of June, 1993

Attest:

MICHAEL K. KIRK

*Attesting Officer*    Acting Commissioner of Patents and Trademarks